(12) United States Patent
Gonzalez Martin et al.

(10) Patent No.: US 12,459,209 B2
(45) Date of Patent: Nov. 4, 2025

(54) 3D PRINTED OBJECT LABELS

(71) Applicant: Peridot Print LLC, Palo Alto, CA (US)

(72) Inventors: Sergio Gonzalez Martin, Sant Cugat del Valles (ES); Jordi Roca Vila, Sant Cugat del Valles (ES); Guiu Tio Medina, Sant Cugat del Valles (ES)

(73) Assignee: Peridot Print LLC, Palo Alto, CA (US)

( * ) Notice: Subject to any disclaimer, the term of this patent is extended or adjusted under 35 U.S.C. 154(b) by 386 days.

(21) Appl. No.: 17/997,196

(22) PCT Filed: May 8, 2020

(86) PCT No.: PCT/US2020/032111
§ 371 (c)(1),
(2) Date: Oct. 26, 2022

(87) PCT Pub. No.: WO2021/225603
PCT Pub. Date: Nov. 11, 2021

(65) Prior Publication Data
US 2023/0173761 A1 Jun. 8, 2023

(51) Int. Cl.
*G05B 13/04* (2006.01)
*B29C 64/393* (2017.01)
*B33Y 10/00* (2015.01)
*B33Y 30/00* (2015.01)
*B33Y 50/02* (2015.01)

(52) U.S. Cl.
CPC ............ *B29C 64/393* (2017.08); *B33Y 10/00* (2014.12); *B33Y 30/00* (2014.12); *B33Y 50/02* (2014.12)

(58) Field of Classification Search
CPC ..... B29C 64/393; B29C 64/386; B29C 73/02; B33Y 10/00; B33Y 30/00; B33Y 50/02
See application file for complete search history.

(56) References Cited

U.S. PATENT DOCUMENTS

| 9,656,428 B2 | 5/2017 | Voris et al. |
| 10,532,523 B2 | 1/2020 | Ur |

(Continued)

FOREIGN PATENT DOCUMENTS

| CN | 101916387 A | 12/2010 |
| CN | 107031033 A | 8/2017 |

(Continued)

OTHER PUBLICATIONS

Ghose, S., "How to Create Incredibly Complex Textured Shapes for 3D Printing, Using Bump Mapping," downloaded from https://grabcad.com/tutorials/how-to-create-incredibly-complex-textured-shapes-for-3d-printing-using-bump-mapping, published Sep. 29, 2018 (Year: 2018).*

*Primary Examiner* — Eric J Yoon
(74) *Attorney, Agent, or Firm* — Michael Dryja (57) ABSTRACT

In an example a method comprises receiving at a processor, a digital model representing an object to be produced by additive manufacturing. The method may comprise receiving, at the processor, a selected location on a surface of the object, where a label is to be formed. The method may further comprise defining a label displacement map associated with the selected location, applying the label displacement map to the digital model, and rendering the digital model including the label displacement map into voxels for additive manufacturing.

15 Claims, 4 Drawing Sheets

(56) References Cited

U.S. PATENT DOCUMENTS

| | | | |
|---|---|---|---|
| 2016/0086258 A1* | 3/2016 | Romes | G06Q 30/0641 |
| | | | 705/27.1 |
| 2016/0260001 A1 | 9/2016 | Flores et al. | |
| 2018/0104898 A1 | 4/2018 | Lameris et al. | |
| 2018/0261037 A1* | 9/2018 | Hudson | G06F 16/289 |
| 2019/0029369 A1* | 1/2019 | VanWagnen | B33Y 80/00 |
| 2019/0139178 A1* | 5/2019 | Cook | G06F 3/1222 |
| 2020/0023587 A1 | 1/2020 | Greene et al. | |
| 2020/0081761 A1* | 3/2020 | Briggs | G06F 11/0733 |

FOREIGN PATENT DOCUMENTS

| | | |
|---|---|---|
| EP | 3566855 A1 | 11/2019 |
| WO | 2017/147412 A1 | 8/2017 |

* cited by examiner

3D PRINTED OBJECT LABELS

BACKGROUND

Additive manufacturing techniques may generate a three-dimensional object through the solidification of a build material, for example on a layer-by-layer basis. In examples of such techniques, build material may be supplied in a layer-wise manner and the solidification method may include heating the layers of build material to cause melting in selected regions. In other techniques, chemical solidification methods may be used.

In some cases 3D printed objects may be labelled, for example, with barcodes, QR codes or alphanumeric codes.

BRIEF DESCRIPTION OF THE DRAWINGS

Non-limiting examples will now be described with reference to the accompanying drawings, in which.

DETAILED DESCRIPTION

Additive manufacturing techniques may generate a three-dimensional object through the solidification of a build material. In some examples, the build material is a powder-like granular material, which may for example be a plastic, ceramic or metal powder and the properties of generated objects may depend on the type of build material and the type of solidification mechanism used. In some examples the powder may be formed from, or may include, short fibres that may, for example, have been cut into short lengths from long strands or threads of material. Build material may be deposited, for example on a print bed and processed layer by layer, for example within a fabrication chamber. According to one example, a suitable build material may be PA12 build material commercially referred to as V1R10A "HP PA12" available from HP Inc.

In some examples, selective solidification is achieved using heat, for example through directional application of energy, for example using a laser or electron beam which results in solidification of build material where the directional energy is applied. In other examples, at least one print agent may be selectively applied to the build material, and may be liquid when applied. For example, a fusing agent (also termed a 'coalescence agent' or 'coalescing agent') may be selectively distributed onto portions of a layer of build material in a pattern derived from data representing a slice of a three-dimensional object to be generated (which may for example be generated from structural design data). The fusing agent may have a composition which absorbs energy such that, when energy (for example, heat) is applied to the layer, the build material heats up, coalesces and solidifies upon cooling, to form a slice of the three-dimensional object in accordance with the pattern. In other examples, coalescence may be achieved in some other manner.

According to one example, a suitable fusing agent may be an ink-type formulation comprising carbon black, such as, for example, the fusing agent formulation commercially referred to as V1Q60A "HP fusing agent" available from HP Inc. In examples, such a fusing agent may comprise any or any combination of an infra-red light absorber, a near infra-red light absorber, a visible light absorber and a UV light absorber. Examples of print agents comprising visible light absorption enhancers are dye based colored ink and pigment based colored ink, such as inks commercially referred to as CE039A and CE042A available from HP Inc.

In addition to a fusing agent, in some examples, a print agent may comprise a coalescence modifier agent, which acts to modify the effects of a fusing agent for example by reducing or increasing coalescence or to assist in producing a particular finish or appearance to an object, and such agents may therefore be termed detailing agents. In some examples, detailing agent may be used near edge surfaces of an object being printed, and may for example act to cool the build material to which it is applied, or otherwise to reduce or prevent coalescence thereof. According to one example, a suitable detailing agent may be a formulation commercially referred to as V1Q61A "HP detailing agent" available from HP Inc. A coloring agent, for example comprising a dye or colorant, may in some examples be used as a fusing agent or a coalescence modifier agent, and/or as a print agent to provide a particular color for the object.

As noted above, additive manufacturing systems may generate objects based on structural design data. This may involve a designer generating a three-dimensional model of an object to be generated, for example using a computer aided design (CAD) application. The model may define the solid portions of the object. To generate a three-dimensional object from the model using an additive manufacturing system, the model data can be processed to derive slices of parallel planes of the model. Each slice may define a portion of a respective layer of build material that is to be solidified or caused to coalesce by the additive manufacturing system.

In production environments, especially where these environments are regulated, it can be useful to provide traceability of parts. Labelling 3D printed objects may provide traceability of printed parts. Prior to printing, objects within a batch or job to be printed can be tracked by tracking the files representing the objects. After the objects have been printed it can also be useful to maintain traceability. However, including a label in the digital model (e.g. in a CAD file) that represents an object to be printed means that fine detail in the label can be lost during the renderization of the object, when transformations are applied to the part to voxelize the digital model in order to convert the digital model into print instructions for a 3D printer. This can make a label unclear or unreadable.

Figure 1:
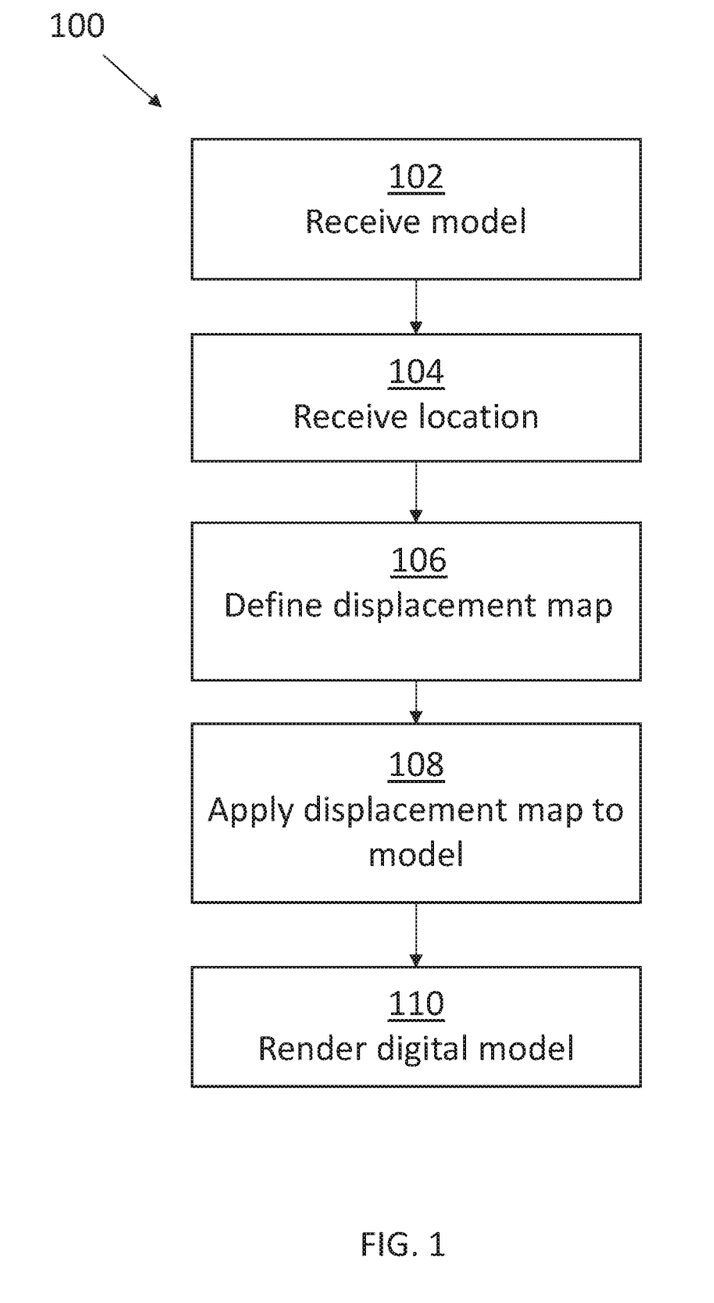
FIG. 1 shows a schematic representation of an example method, which may be a method for applying a label to a 3D printed object.

FIG. 1 shows an example method, which may be a method for applying a label to a 3D printed object. Block 102 of method 100 comprises receiving at a processor, a digital model representing an object to be produced by additive manufacturing.

Block 104 of method 100 comprises receiving at the processor, a selected location on a surface of the object, where a label is to be formed. The location may be selected by a user or may be selected automatically e.g. in a pre-print application.

Block 106 comprises defining a label displacement map associated with the selected location on the surface of the object. The displacement map (or bump map) may be a 3MF displacement map. In some examples, the displacement map may comprise a grayscale image (e.g. a PNG image) which describes the height to which the original surface should be displaced (e.g. with a white end of the scale indicating a maximum displacement and a black end of the scale indicating a minimum displacement). The displacement map defines a number of parameters or dimensions of the label which may be set automatically or set by a user, e.g. in a pre-print application. For example, the displacement map may define a height configuration parameter in microns that defines the maximum displacement to be applied to the surface of the object. The displacement map may also define whether a positive or negative displacement should be applied to the surface, to either emboss or engrave the label in the surface of the object respectively. The displacement map defined in block 106 may also define the overall size and shape of the area on the surface of the object which is to form the label. In addition, the angle of the displacement relative to the surface of the object may be defined in block 106. For example, where the surface of the digital model is defined by a triangle mesh, block 106 may comprise assigning vectors to surface triangle vertices defining the direction of the displacement and depth or offset parameters to define the magnitude of the displacement. The assigned vectors can also define an angle of the displacement relative to the surface of the object.

In some examples, the defined label displacement map includes an identifier code or a series of identifier codes forming the content of the label. The identifier code(s) may be completely defined as part of the displacement map in a pre-print application, either automatically or by a user. The identifier code to be represented by the label may be, for example, a barcode, QR code, alphanumeric code or other object identifier. The identifier code may be based on metadata associated with the part or may be another suitable code. The identifier code may be a unique code associated with the object.

In some examples, defining the label displacement map at block 106 comprises first defining a template displacement map (for example in a pre-print application). The template displacement map may define one or a plurality of parameters of the label such as the size and shape of the overall surface area to be taken up by the label, the displacement height and direction, a maximum displacement, a font to use for an alphanumeric code, a QR version to use for OR codes, or other parameters. These pre-defined setting may be included as metadata in the template displacement map. In some examples, the template displacement map may also define part of the label content, e.g. a first code in a series of identifier codes or a first part of an identifier code. The template displacement map may be applied at the selected location, e.g. using a pre-print application. The template displacement map may therefore act as a placeholder or dummy displacement map. The method may then comprise generating a unique identifier code. For example, after the template displacement map has been associated with the selected location in a pre-print application, the digital model may be sent to a 3D printing apparatus for printing. In some examples, the 3D printing apparatus may then generate all or part of an identifier code for the part. In some examples, the unique identifier code may be generated based on print metadata associated with the print job, which may include data such as a part number, batch number, print timestamp, print session information, printer identifier, position/order of object within a print batch and other data related to the object or the printing process. In some examples, the identifier code may be any uniquely generated code. In some examples, metadata associated with the object and/or the print process may be reported by a print apparatus e.g. to a web service in association with the unique identifier. A user may then be able to input the assigned identifier code via the web service in order to access metadata associated with the part. This enables the label to be kept to a small size whilst also enabling a user to access metadata about the object via the unique identifier included in the label. Basing the identifier code on metadata relating to the object and/or to the printing process may provide improved traceability of the part.

Once the identifier code has been generated, the template displacement map may be modified to include the identifier code represented as an embossed and/or engraved label. The identifier code may be represented e.g. as a barcode, QR code, alphanumeric code, or another suitable representation for labelling the object.

In some examples, the displacement map including the identifier code may be defined by a user or automatically in a pre-print application and applied directly to the digital model without using a template displacement map.

In the case of a re-print of the same object, the method may comprise reprocessing the object so that new identifiers are assigned to the object for each re-print.

Generating and applying identifier codes using the method of FIG. 1 enables a unique identifier code to be applied to each printed object. In particular, the method of FIG. 1 enables re-prints of the same digital model to have different, unique identifier codes, since the label is not part of the digital model itself but rather is defined in a displacement map associated with the digital model, which can then be modified independently from the digital model.

Modifying a template displacement map to include a generated code enables certain features of the label to be configured by a user whilst also enabling an automatically and dynamically generated code to be included in the label, which can include metadata associated with the object and/or the printing process and which can be defined as part of the printing process.

Block 108 of method 100 comprises applying the label displacement map to the digital model. Applying the label displacement map to the digital model may comprise associating the label displacement map may be associated with the digital model, for example as metadata associated with the digital model. The surface of the digital model may be defined as a polygon mesh such as a triangle mesh, with each triangle having associated metadata defining the label displacement map. In some examples, the digital model and the displacement map may be encoded together in a 3MF file along with all job information for a particular print job for submission to a printer.

Block 110 of the digital model 100 comprises rendering the digital model including the label displacement map into voxels for additive manufacturing. At this point, both the digital model and the displacement map defining the label may be resolved into voxels for printing by a 3D printer. The voxelization process may be an octree construction method, or another suitable type of voxelization process may be used. In some examples, the method 100 may comprise printing the 3D object as defined by the rendered digital model. Block 110 may comprise applying erosion and dilation operations for adjusting the part quality during the rendering process. In this case, these operations may be applied to the digital model before the label is rendered. In some cases the metadata of the displacement map may include an expected label height and the rendering process may include applying a correction to ensure that the height/depth of the label as defined in the print instructions matches the expected label height.

The method effectively enables small features in the labels to be protected from any smoothing operations comprising erosions and dilations or other operations that would cause a loss of visibility of the label during the voxelization process, as the region that contains the displacement is kept separate from the digital model, for example, the displacement may be identified in the mesh by the associated displacement map metadata, rather than being defined in the triangle mesh itself (which would result in having impractically small triangles defining the label.)

Figure 2:
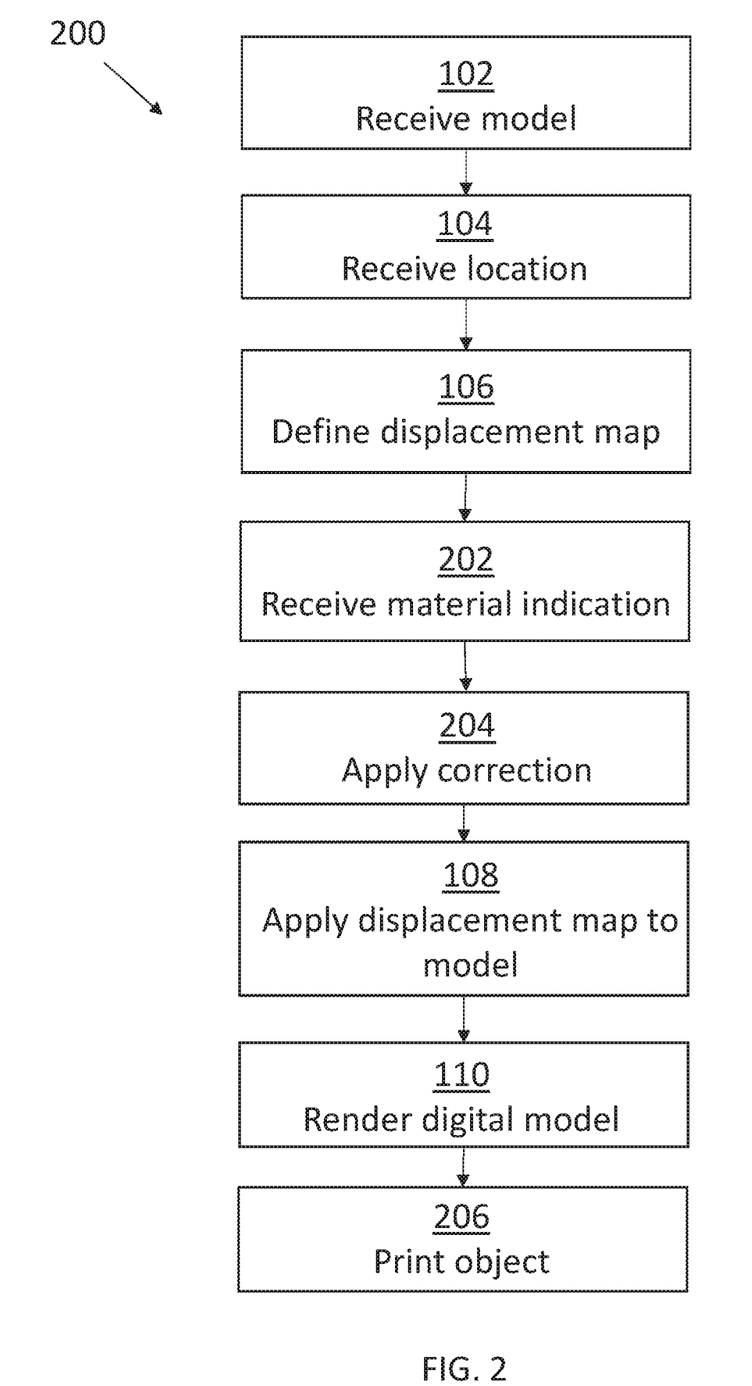
FIG. 2 shows a schematic representation of another example method, which may be a method for applying a label to a 3D printed object.

FIG. 2 shows another example method 200 for applying a label to a 3D printed object. The method 200 includes blocks 102 to 110 as described above in reference to FIG. 1. In addition, the method 200 comprises block 202, which comprises receiving an indication of an additive manufacturing material e.g. a build material and/or a set of print agents to be used for producing the object.

Block 204 of method 200 comprises applying a correction to the label displacement map based on the properties of the material. In some examples, the correction may be a correction applied to a maximum displacement parameter associated with the label displacement map. In some examples, the correction may be to one, or a plurality of physical dimensions of the label such as displacement height/depth of features in the label, the overall size of the label or other dimensions defined within the label such as the width of lines in a barcode. In some examples, the properties of the material on which the correction is based may comprise scaling properties such as thermal scaling properties, i.e. to account for thermal shrinkage due to the printing and cooling process.

Providing an automatic correction to the label in response to receiving an indication of which material(s) are to be used to print a particular object enables the depth/height and or size of the labels to be adjusted so that they are more clearly visible in the selected material. Effects such as shrinkage or expansion of the material during printing (which may happen to a greater or lesser extent depending on the type of material used) can be automatically compensated for so that the dimensions of the label and label features as printed will match the dimensions defined in the displacement map and expected by a user, regardless of the type of material used for printing the 3D object.

After rendering the digital model at block 110, method 200 also includes block 206 which comprises printing the object by additive manufacturing.

Figure 3:
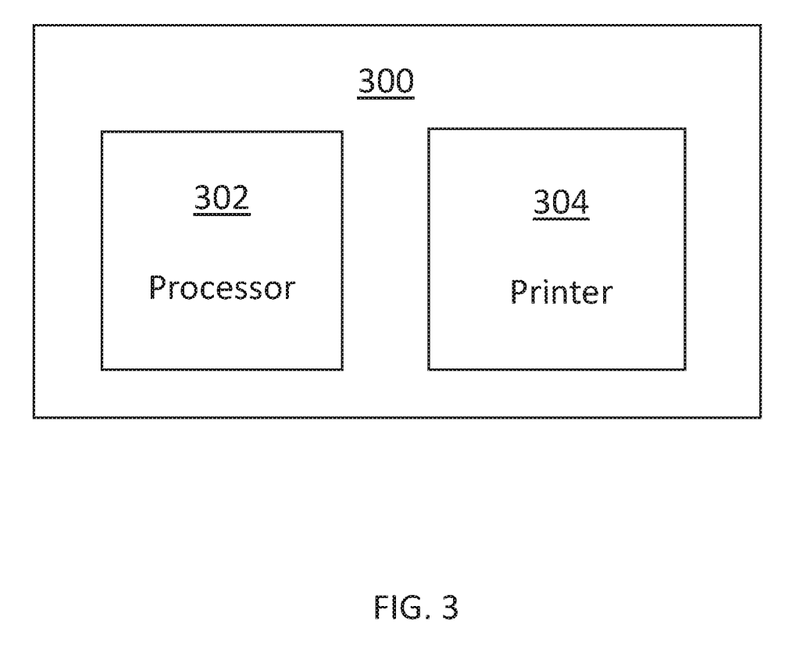
FIG. 3 shows a schematic representation of an example 3D printing apparatus.

FIG. 3 shows an example 3D printing apparatus 300. The 3D printing apparatus 300 may be to perform some or all of the blocks described above in relation to FIGS. 1 and 2.

The 3D printing apparatus 300 comprises a processor 302 and a printer 304. The processor 302 is to receive a digital model representing an object to be produced by additive manufacturing. The processor 304 is further to receive a location on a surface of the object to which a label is to be applied. The processor may receive the digital model and the location information via a 3MF file defining a job to be printed comprising the object.

In some examples, the processor may be to extract part geometries of the print job and their instantiations along with associated 3D affine transform matrices which position the part in the fabrication chamber.

The processor 304 is to generate an identifier code to be represented by the label. The generated code may be, for example a barcode, QR code, alphanumeric code or other code representing a unique identifier to be associated with the object. For example, for alphanumeric codes the code may be generate using a text font renderer, for QR codes or barcodes, a standard library can be used to generate the identifier.

The processor 304 is to apply the label representing the generated code to the digital model at the location. In some examples, applying the label to the digital model comprises applying a surface displacement map to the digital model e.g. as described above. The processor 304 is further to render the digital model including the label into voxels.

The printer 304 is to print the object represented by the rendered digital model by additive manufacturing.

In some examples, receiving the location by the processor 304 comprises receiving a template displacement map associated with a particular location on the surface of the object. In some examples, the template displacement map may define one or a plurality of attributes or parameters associated with the label in addition to the location for placement of the label on the object. For example the template displacement map may define a maximum displacement depth/height, a displacement direction and magnitude, an overall size and shape of an area of the digital model surface where the label is to be applied, a type of label to be applied, and/or other parameters associated with the label. In some examples, where the processor is to receive a template displacement map, the processor is then to modify or replace the template displacement map to provide a displacement map representing the generated code, prior to applying the label to the digital model.

Figure 4:
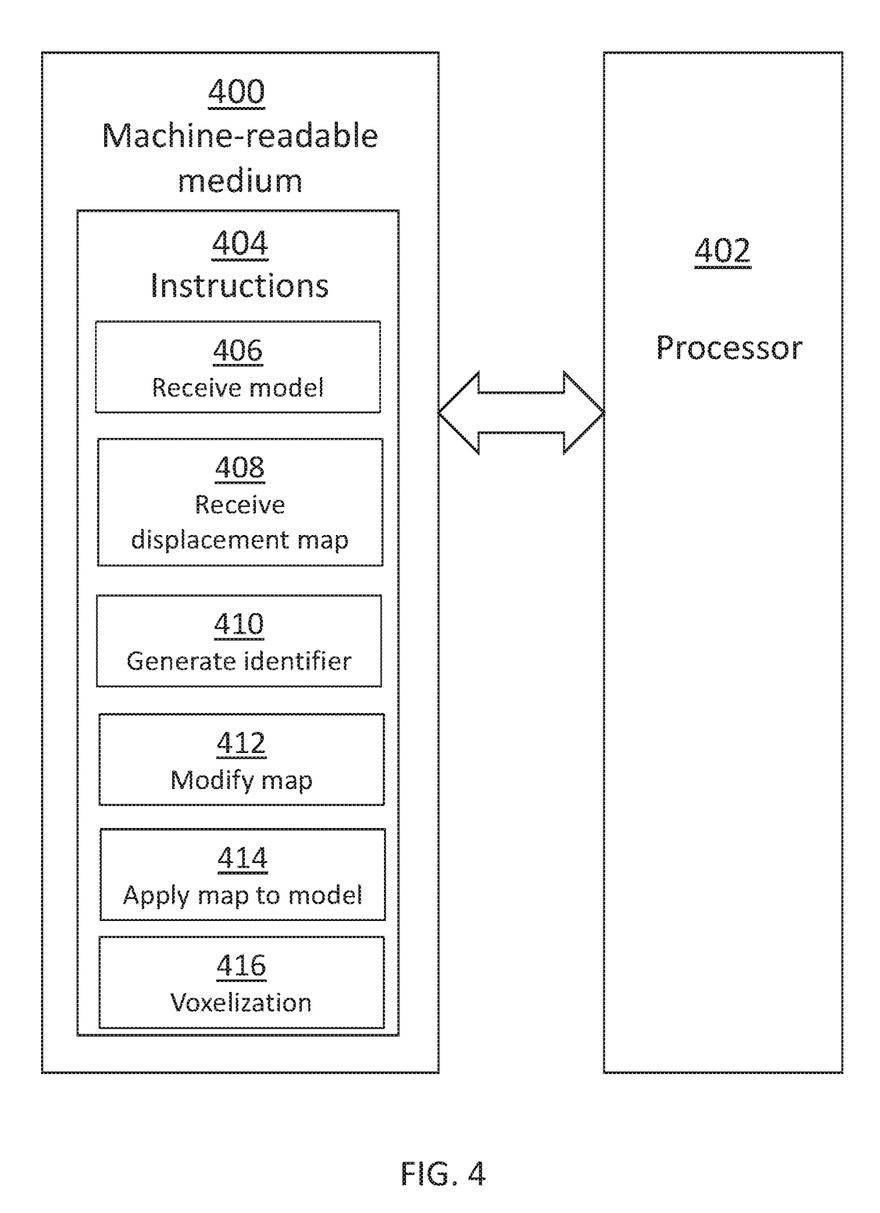
FIG. 4 shows a schematic representation of an example machine-readable medium in association with a processor.

In some examples, the processor 304 is to apply a correction to a dimension of the label based on a print parameter. The print parameter may be a type of build material from which the object is to be produced, and/or a thermal scaling factor associated with that material or another scaling factor or other parameter associated with the material or the print process. In some examples, correcting the print parameter may comprise applying a printer specific calibration, FIG. 4 shows an example machine-readable medium 400 in association with a processor 402. The machine-readable medium 400 may comprise instructions to perform some or all of the blocks described above in relation to FIGS. 1 and 2. In some examples, the machine-readable medium may be to form part of a printing apparatus as described above in relation to FIG. 3.

The machine-readable medium comprises instructions 404 which, when executed by the processor 404, cause the processor to, at block 406, receive a digital model representation of a 3D object wherein the digital model is to be converted to print instructions for a 3D printer. At block 408, the instructions are to receive a displacement map associated with a selected location on a surface of the digital model defining properties of the label. At block 410 the instructions are to generate a unique identifier code. At block 412 the instructions are to modify the displacement map so that the label represents the unique identifier code. At block 414 the instructions are to apply the modified displacement map to the digital model and at block 416 the instructions are to perform a voxelization process on the digital model including the modified displacement map to convert the digital model into a set of print instructions.

In some examples, the machine-readable medium 400 may comprise further instructions, to cause the processor to receive an indication of a type of build material to be used to produce the 3D object and modify a dimension of the displacement map based on a material property associated with the build material type. In some examples, the material property comprises a scaling factor associated with the build material type, such as a thermal scaling factor.

In some examples, the generated unique identifier code is based on metadata associated with the 3D object. For example a part number, batch number, print timestamp, printer identifier, position/order of object within a print batch or other metadata associated with the 3D object.

The present disclosure is described with reference to flow charts and/or block diagrams of the method, devices and systems according to examples of the present disclosure, Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

It shall be understood that some blocks in the flow charts can be realized using machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode. Further, some teachings herein may be implemented in the form of a computer software product, the computer software product being stored in a storage medium and comprising a plurality of instructions for making a computer device implement the methods recited in the examples of the present disclosure.

The word "comprising" does not exclude the presence of elements other than those listed in a claim, "a" or "an" does not exclude a plurality, and a single processor or other unit may fulfill the functions of several units recited in the claims.

The features of any dependent claim may be combined with the features of any of the independent claims or other dependent claims.

What is claimed is:

1. A method comprising:
   receiving, by a processor of a 3D printing apparatus, a file including:
   a digital model representing an object, an instance of which is to be printed by the 3D printing apparatus;
   a selected location on a surface of the object at which a label is to be formed including a part identifier that uniquely identifies the instance of the object when printed by the 3D printing apparatus; and
   a label displacement map associated with the selected location;
   generating, by the processor of the 3D printing apparatus, the part identifier;
   generating, by the processor of the 3D printing apparatus, the label, including the part identifier, to be formed at the selected location when printed;
   determining, by the processor of the 3D printing apparatus, material-specific parameters associated with a selected material to be used when printing the instance of the object;
   applying, by the processor of the 3D printing apparatus, the label displacement map to the digital model during a voxelization process of the digital model to generate a voxelized model of the object, including adding the label at the selected location on the surface of the object, and taking into account the material-specific parameters; and
   printing, by the 3D printing apparatus, the instance of the object using the selected material, in accordance with the voxelized model,
   wherein the label displacement map is applied to the digital model by the processor of the 3D printing apparatus during the voxelization process such that the label is visible when the instance of the object is printed using the selected material.

2. The method of claim 1, wherein the file further includes print metadata associated with the object, and wherein the part identifier is generated in accordance with the print metadata.

3. The method of claim 1, wherein the file further includes label parameters specifying a magnitude and/or direction of displacement to be applied to the label displacement map to add the label at the selected location on the surface of the object, during the voxelization process.

4. The method of claim 1, further comprising:
   receiving indication of the selected material to be used when printing the instance of the object.

5. The method of claim 1, wherein the material-specific parameters include a thermal scaling factor associated with the selected material.

6. A 3D printing apparatus comprising:
   a processor;
   a memory storing instructions executable by the processor to:
   receive a file including:
   a digital model representing an object, an instance of which is to be printed by the 3D printing apparatus;
   a selected location on a surface of the object at which a label is to be formed including a part identifier that uniquely identifies the instance of the object when printed by the 3D printing apparatus; and
   a label displacement map associated with the selected location;
   generate the part identifier;
   generate the label, including the part identifier, to be formed at the selected location when printed;
   determine material-specific parameters associated with a selected material to be used when printing the instance of the object; and
   apply the label displacement map to the digital model during a voxelization process of the digital model to generate a voxelized model of the object, including adding the label at the selected location on the surface of the object, and taking into account the material-specific parameters; and a 3D printer to print the instance of the object using the selected material, in accordance with the voxelized model, wherein the label displacement map is applied to the digital model by the processor of the 3D printing apparatus during the voxelization process such that the label is visible when the instance of the object is printed using the selected material.

7. The 3D printing apparatus of claim 6, wherein the file further includes print metadata associated with the object, and wherein the part identifier is generated in accordance with the print metadata.

8. The 3D printing apparatus of claim 6, wherein the file further includes label parameters specifying a magnitude and/or direction of displacement to be applied to the label displacement map to add the label at the selected location on the surface of the object, during the voxelization process.

9. The 3D printing apparatus of claim 6, wherein the instructions are executable by the processor to further:

receive indication of the selected material to be used when printing the instance of the object.

10. The 3D printing apparatus of claim 6, wherein the material-specific parameters include a thermal scaling factor associated with the selected material.

11. A non-transitory machine-readable medium storing instructions executable by a processor of a 3D printing apparatus to perform processing comprising:

receiving a file including:
  a digital model representing an object, an instance of which is to be printed by the 3D printing apparatus;
  a selected location on a surface of the object at which a label is to be formed including a part identifier that uniquely identifies the instance of the object when printed by the 3D printing apparatus; and
  a label displacement map associated with the selected location;

generating the part identifier;

generating the label, including the part identifier, to be formed at the selected location when printed;

determining material-specific parameters associated with a selected material to be used when printing the instance of the object;

applying the label displacement map to the digital model during a voxelization process of the digital model to generate a voxelized model of the object, including adding the label at the selected location on the surface of the object, and taking into account the material-specific parameters; and causing the 3D printing apparatus to print the instance of the object using the selected material, in accordance with the voxelized model, wherein the label displacement map is applied to the digital model by the processor of the 3D printing apparatus during the voxelization process such that the label is visible when the instance of the object is printed using the selected material.

12. The non-transitory machine-readable medium of claim 11, wherein the file further includes print metadata associated with the object, and wherein the part identifier is generated in accordance with the print metadata.

13. The non-transitory machine-readable medium of claim 11, wherein the file further includes label parameters specifying a magnitude and/or direction of displacement to be applied to the label displacement map to add the label at the selected location on the surface of the object, during the voxelization process.

14. The non-transitory machine-readable medium of claim 11, wherein the processing further comprises:

receiving indication of the selected material to be used when printing the instance of the object.

15. The non-transitory machine-readable medium of claim 11, wherein the material-specific parameters include a thermal scaling factor associated with the selected material.

\* \* \* \* \*